Nov. 18, 1958     J. E. McHUGH, JR     2,860,394
TENSION ABSORBING DEVICE
Filed Oct. 29, 1957
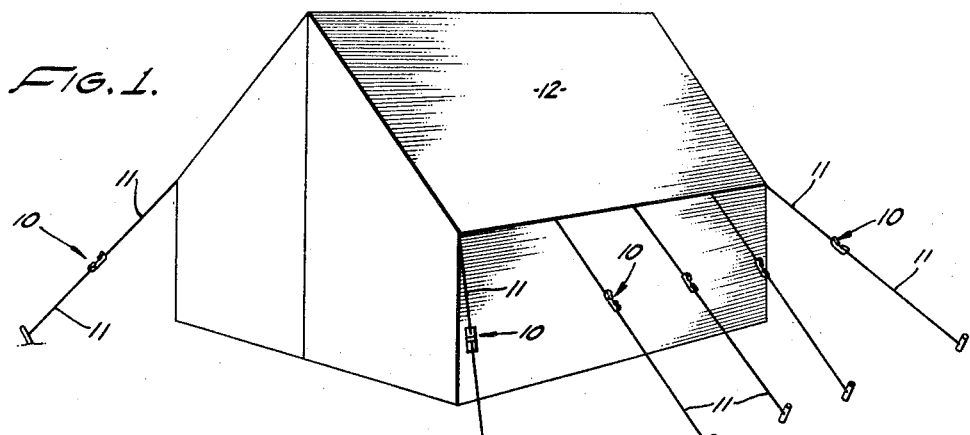
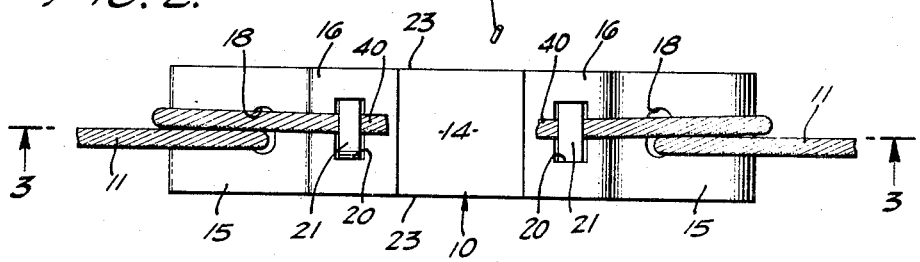
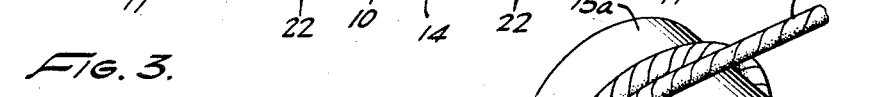
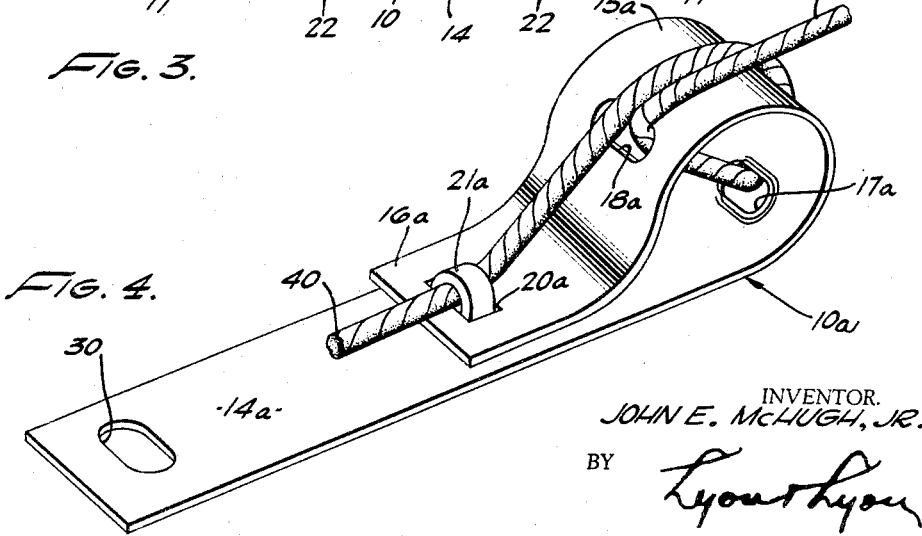
INVENTOR.
JOHN E. McHUGH, JR.
BY
ATTORNEYS

2,860,394
TENSION ABSORBING DEVICE

John E. McHugh, Jr., North Hollywood, Calif.

Application October 29, 1957, Serial No. 693,093

7 Claims. (Cl. 24—73)

This invention relates to a connector device adapted to absorb tension forces in ropes, cables, wires and the like.

This application is a continuation-in-part of my copending application, Serial No. 481,857, filed January 14, 1955.

One of the principal objects of this invention is to provide a novel connector device provided with tension absorbing means.

Another object of this invention is to provide a novel tension-absorbing connector device for ropes, cables and the like, the device being highly effective yet extremely simple in construction and adapted to be manufactured economically on a quantity basis.

Another object of this invention is to provide a simple device to facilitate the tightening or taking up of slack or sag in cable or wire caused by fatigue.

Other objects and advantages of this invention it is believed will be readily apparent from the following detailed description of preferred embodiments thereof when read in connection with the accompanying drawings.

In the drawings:

Figure 1 is a perspective view illustrating the device of this invention as applied to tent ropes.

Figure 2 is a top plan view of the device of this invention.

Figure 3 is a perspective view taken substantially on the line 3—3 of Figure 2.

Figure 4 is a perspective view of a modified form of the invention.

Referring now to the drawings, the device of this invention is generally indicated 10 and is shown in Figure 1 as applied to the tent ropes 11 of a tent 12.

The device 10 is formed of a single, elongated strip of spring steel or other resilient material having a central, flat base member 14. Extending upwardly from each end of the base portion and integral therewith is a spring element 15 curved to form a loop, each of the elements 15 terminating in end portions 16. The end portions 16 overlie the base member 14 substantially parallel thereto, but spaced therefrom as shown. Each of the spring elements 15 is provided with a central aperture 17 adjacent the intersection of the base member and the elements 15, and a second aperture 18, the apertures being arcuately spaced and preferably relatively positioned so that a line therethrough forms an angle of roughly 30° with the plane of the base member. As shown in Figure 3, both transverse edges of the apertures 18, and the upper transverse edge of the aperture 17, are turned in to form rounded edges against which the rope 11 bears, thus eliminating any sharp edges which would tend to damage or cut into the rope when it is put under tension.

Each of the end portions 16 is provided with a transverse opening 20 through each of which extends a curved securing or clamp element 21. As indicated in the drawings, the clamp elements are formed integrally with the base member 14 by slitting the base member along transverse lines 22 which terminate short of the sides 23 of the base member, and pressure deforming the portions of the the base member between the two pairs of slits to form raised or upwardly-bulged central sections, both ends of the clamp elements remaining integral with the base member 14. The formation of the clamp elements is most conveniently carried out by a stamping operation wherein the lines 22 and the upwardly-bulged section are formed simultaneously by means of a stamping punch and die.

The device described above has many applications, being particularly adapted for use in applications where two lengths of rope, wire, cable or the like are to be connected together or where a damaged cable is to be spliced, and provided with tension absorbing means. In the use shown, each of the two ends of the tent ropes 11 is first brought over the top of one of the curved spring elements 15 and through one of the apertures 18, then through the corresponding aperture 17, around the curved spring element 15, and then between the clamp element 21 and the end portion 16. In order to pass the rope ends 40 under the clamp elements 21, the resiliency of the device permits the end portions 16 to be easily depressed against the base member. In this manner the ropes 11 are readily pulled taut. The clamping action of the end portions 16 and the clamp elements 21 is such as to securely hold the ropes in place against outward movement, even against great tension forces applied to the ropes. In fact, the greater the tension forces, the tighter is the clamping action between the end portions 16 and the clamp elements 21, due to the fact that the tension forces exerted on the rope exerts a lifting action upon the end portions 16, lifting them away from the base member and toward the clamp members 21, squeezing the rope therebetween with greater and greater pressure as the tension on the rope is increased. It will also be understood that the resilience of the spring elements 15 is such as to absorb stresses in the ropes resulting from tension forces which may be quickly applied under normal usage of the ropes.

With the structure described, sagging or slacking of the rope or cable, produced by tension, fatigue or otherwise, is easily taken up by pulling on the end or ends 40 of the rope or cable. It has been found that, due to the structure of the spring elements 15 and the relative positioning of the apertures 17 and 18, the rope or cable may be pulled taut as described, without manipulation of the device other than merely pulling of the rope or wire. On the other hand, the device securely holds the rope or wire against tension forces in the other direction.

A modified form of the invention is shown in Figure 4. The device 10a shown therein is substantially identical to the device 10 described above, except that it is provided with only a single spring element 15a. Here the base member 14a is provided with an end aperture 30 for anchoring the device 10a to any convenient place, such as to the tent stakes in the example shown. It will thus be understood that the device 10a is especially designed for use as a connector and tension absorbing device for application to the ends of single ropes, cables, wires and the like. The operation is otherwise the same as that described above.

While the device of this invention has been illustrated as applied to tent ropes, it will be understood to those skilled in the art that probably its most important use is as a terminal for cable ends where wire or cable fatigue is a factor, and to facilitate tightening up of sag or slack caused by stretching of the wire or cable resulting from tension and fatigue. These devices are particularly applicable as terminals for the many control cables required for the ailerons, flaps, stabilizers, etc., of airplanes, guided missiles and other aircraft. The resiliency of the spring elements is such as to prevent snapping or tearing of the cables when put under conditions of quick tension or sudden stress, as is frequently the case with such cables.

Having fully described my invention, it is to be understood that I do not wish to be limited to the details set forth, but my invention is of the full scope of the appended claims.

I claim:

1. A combination clamping device and line, comprising: an elongated, resilient strip curved to form a loop portion upstanding from a base, the loop portion terminating in a forwardly directed end portion overlying and substantially parallel to the said base, said end portion having an opening therein and said base having a curved U-shaped clamp element adapted to extend upwardly through said opening so that said clamp element and said end portion cooperate to form a clamp therebetween, said loop portion having a pair of longitudinally spaced apertures on the peripheral surface thereof, and a line which is brought downwardly through the aperture positioned on the loop nearest to the opening in the end portion, across the inside of the loop, then brought outwardly through the other aperture, directed upwardly and around the outside top surface of the loop portion and then forwardly and under the said U-shaped clamp element so as to lie between the top of the said clamp element and the top of said end portion, the relationship being such that the line may be pulled through the device forwardly but is clamped by the device if the line is pulled rearwardly so that the force on the loop causes the said free end portion to rise and increase the clamping pressure between said end portion and said clamp element.

2. A combination clamping device and line, comprising: an elongated, resilient strip curved to form a loop portion upstanding from a base, the loop portion terminating in a forwardly directed end portion overlying and substantially parallel to the said base, said end portion having an opening therein and said base having a clamp element adapted to extend upwardly through said opening so that said clamp element and said end portion cooperate to form a clamp therebetween, said loop portion having a pair of longitudinally spaced apertures on the peripheral surface thereof, and a line which is brought downwardly through the aperture positioned on the loop nearest to the opening in the end portion, across the inside of the loop, then brought outwardly through the other aperture, directed upwardly and around the outside top surface of the loop portion and then forwardly and under the said clamp element so as to lie between the top of the said clamp element and the top of said end portion, the relationship being such that the line may be pulled through the device forwardly but is clamped by the device if the line is pulled rearwardly so that the force on the loop causes the said free end portion to rise and increase the clamping pressure between said end portion and said clamp element.

3. The combination clamping device and line as defined in claim 2 wherein said elongated, resilient strip is curved at each end to form a pair of looped portions upstanding from a base, each looped portion having the characteristics defined and wherein a line is directed through each looped portion in the manner defined for the single loop.

4. A device for clamping a line, comprising: an elongated, resilient strip curved to form a loop portion upstanding from a base, the loop portion terminating in a forwardly directed end portion overlying and substantially parallel to the said base, said end portion having an opening therein and said base having a clamp element adapted to extend upwardly through said opening so that said clamp element and said end portion cooperate to form a clamp therebetween, said upstanding loop portion having a pair of longitudinally spaced apertures on the peripheral surface thereof, so that a line may be brought downwardly through the aperture positioned on the loop nearest to the opening in the end portion, across the inside of the loop, then brought outwardly through the other aperture, directed upwardly and around the outside top surface of the loop portion and then forwardly and under the said clamp element so as to lie between the top of the said clamp element and the top of said end portion, the relationship being such that the line may be pulled through the device forwardly but is clamped by the device if the line is pulled rearwardly so that the force on the loop causes the said free end portion to rise and increase the clamping pressure between said end portion and said clamp element.

5. The device of claim 4 wherein one of said longitudinally spaced apertures is positioned on said loop portion adjacent the intersection of said loop portion with the base and the other of said apertures is positioned on said loop portion between the top of said loop portion and said forwardly directed end portion.

6. The device of claim 4 wherein said apertures are so positioned that a line passed therethrough forms an angle of approximately 30° with the plane of the base member.

7. A device for clamping and absorbing tension in a line, comprising: an elongated, resilient strip curved upwardly and inwardly, at each end to form a pair of loop portions, one upstanding from each end of a substantially planar base, the loop portions each terminating in a free end portion overlying and substantially parallel to said base, said end portions each having an opening therein and said base having a pair of clamp elements, one adapted to extend upwardly through each of said openings so that said clamp elements and end portions each cooperate to form a clamp therebetween, each of said loop portions having a pair of longitudinally spaced apertures on the peripheral surface thereof, so that a line may be brought downwardly through an aperture positioned on a loop nearest the opening in the end portion of such loop, across the inside of said loop, then brought outwardly through the other aperture of said loop, directed upwardly and around the outside top surface of the loop portion and then forwardly and under the clamp element of said loop so as to lie between the top of said clamp element and the top of said end portion, the relationship being such that the line may be pulled through the device in the direction of the free end portion but is clamped by the device if the line is pulled rearwardly, so that the force on the loop causes the free end portion to rise and increase the clamping pressure between said end portion and said clamp element.

References Cited in the file of this patent

UNITED STATES PATENTS 1,334,624    Martin _____ Mar. 23, 1920